United States Patent
Hofmann et al.

(10) Patent No.: US 6,728,234 B1
(45) Date of Patent: Apr. 27, 2004

(54) METHOD AND APPARATUS FOR USING A LOW CLOCK FREQUENCY TO MAINTAIN A TIME REFERENCE GOVERNED BY A HIGH CLOCK FREQUENCY

(75) Inventors: Ludwig Hofmann, Ilmmünster (DE); Frank Lillie, München (DE); Jan Meyer, Weilheim (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/500,417

(22) Filed: Feb. 8, 2000

Related U.S. Application Data

(63) Continuation of application No. PCT/DE98/02244, filed on Aug. 5, 1998.

(30) Foreign Application Priority Data

Aug. 8, 1997 (DE) .......................................... 197 34 432

(51) Int. Cl.$^7$ .................................................. H04J 3/06
(52) U.S. Cl. ...................... 370/350; 370/311; 370/503; 375/357; 455/574; 713/322
(58) Field of Search .................................. 370/311, 328, 370/345, 346, 350, 498, 500, 503, 507, 508, 509, 514, 516, 517, 518, 520, 522, 525, 526, 347; 455/343, 572, 574; 375/354, 357; 713/320, 322, 324, 501

(56) References Cited

U.S. PATENT DOCUMENTS

| | | | | |
|---|---|---|---|---|
| 5,737,323 A | * | 4/1998 | Lansdowne | 370/311 |
| 5,815,819 A | * | 9/1998 | Ohta et al. | 455/574 |
| 5,950,120 A | * | 9/1999 | Gardner et al. | 455/343 |
| 6,029,061 A | * | 2/2000 | Kohlschmidt | 455/343 |

FOREIGN PATENT DOCUMENTS

| | | |
|---|---|---|
| EP | 0 726 687 A1 | 8/1996 |
| EP | 0 851 593 A2 | 7/1998 |
| GB | 2 320 398 A | 6/1998 |

\* cited by examiner

*Primary Examiner*—Ricky Ngo
*Assistant Examiner*—Thomas E. Volper
(74) *Attorney, Agent, or Firm*—Laurence A. Greenberg; Werner H. Stemer; Gregory L. Mayback

(57) ABSTRACT

The present invention relates to a method for maintaining a time reference which is governed by a high clock frequency produced by a first clock frequency generator, in which a changeover is essentially made, for a changeover time period, to a low clock frequency produced by a second clock frequency generator. The apparatus of the invention maintains the time reference governed by the high clock frequency, wherein a changeover is made to the low clock frequency for a specific changeover time period. The invention is advantageously used to save power in electronic apparatus such as in mobile stations of mobile radio systems.

14 Claims, 2 Drawing Sheets

METHOD AND APPARATUS FOR USING A LOW CLOCK FREQUENCY TO MAINTAIN A TIME REFERENCE GOVERNED BY A HIGH CLOCK FREQUENCY

CROSS-REFERENCE TO RELATED APPLICATION

This is a continuation of copending International Application PCT/DE98/02244, filed Aug. 5, 1998, which designated the U.S.

BACKGROUND OF THE INVENTION

Field of the Invention

The present invention relates to a method and an apparatus for maintaining a time reference which is governed by a high clock frequency, wherein a changeover is essentially made, for a changeover time period, to a low clock frequency.

In order to allow a mobile radio telephone to be reached at all times, it is necessary to operate the mobile radio telephone in the so-called standby mode (paging). In this mode, information is received from the respective base station, via the radio interface, in a precise, predetermined time reference. In the GSM Standard TDMA method (time division multiple access), the time reference is, for example, governed by a frame length of approximately 4.6 ms. An incoming call is signaled in the information received from the base station.

These information blocks containing signaling data may be separated from one another by up to several seconds, but must then be received again, in the predetermined time reference, with an accuracy in the microsecond ($\mu s$) range.

In order to ensure this reception of information exactly, a high-precision, high-frequency clock frequency generator generally remains switched on all the time in the mobile radio telephone. In Siemens GSM mobile telephones, for instance, the clock frequency generator is a voltage-controlled and temperature-compensated crystal oscillator which produces a high clock frequency of about 13 MHz. Such a radio-frequency crystal oscillator consumes a relatively great amount of power, which is disadvantageous for the operating duration, particularly for mobile radio telephones powered by batteries or rechargeable batteries in a mobile radio system. The radio-frequency crystal oscillator is coupled to the base station via a control algorithm. The base station supplies a reference burst for this frequency control of the crystal oscillator in order to maintain the synchronization between the mobile station and the base station.

SUMMARY OF THE INVENTION

The object of the invention is thus to provide a method and an apparatus for maintaining a time reference which is governed by a fast clock frequency, which overcomes the shortcomings and disadvantages of the prior art systems and wherein the power consumption of a clock frequency generator producing the fast clock frequency can be reduced while maintaining the time reference.

With these objects in view there is provided, in accordance with the invention, a method of maintaining a time reference governed by a high clock frequency produced by a first clock frequency generator, wherein a changeover is made, for a changeover time period, to a low clock frequency produced by a second clock frequency generator. The novel method comprises the following method steps:

a) trimming the low and high clock frequencies during a trimming time period;

b) starting a counter for the high clock frequency;

c) stopping the counter for the high clock frequency in dependence of the low clock frequency, defining an intermediate value and, immediately thereafter, d) starting a counter for the low clock frequency;

e) deactivating the first clock frequency generator;

f) stopping the counter for the low clock frequency at a first final value determined on the basis of a predetermined first final trimming value used for trimming, after an activation of the first clock frequency generator and, immediately thereafter, g) restarting the counter for the high clock frequency from the intermediate value; and h) stopping the counter for the high clock frequency at a second final value determined on the basis of a reference value, obtained during trimming, for the high clock frequency.

The method according to the invention and the apparatus according to the invention make it possible, for example in a mobile station of a mobile radio system, to maintain the time reference in the standby mode (paging) between the received blocks of signaling data using, for example, a low-frequency clock oscillator circuit. A clock oscillator circuit has a relatively low frequency of 32.768 kHz in comparison to the normal clock frequency of 13 MHz in conventional mobile radio systems. Such a clock oscillator circuit has the major advantage of a lower price, since it is a mass-produced item, and of an extremely low power consumption. Furthermore, some mobile stations are already provided with such a clock oscillator circuit as a real time clock so that, in this case, it is possible to use clock oscillator circuits which are already present in the appliances. However, the invention is not limited to use in mobile stations of mobile radio systems but, in general, advantageously allows a low clock frequency to be used to maintain a time reference which is governed by a high clock frequency.

Using a low clock frequency to take over the time reference allows high-precision clock frequency generators for a high clock frequency, which have a high power consumption, to be switched off temporarily, and allows the maintenance of the time reference to be transferred to inexpensive clock frequency generators for low clock frequencies, which have a low power consumption.

In its application to mobile stations, in particular, the present invention in this case solves the problem of exact maintenance of synchronization between the mobile station and the respective base station, using a relatively low-frequency oscillator. This problem results, on the one hand, from the frequency of 32.768 kHz of the conventional clock oscillator circuit, which is very low in comparison with the frequency of 13 MHz, and from the time interval of 30.5 us associated with this, and on the other hand from the normally poor frequency stability of the clock oscillator (for example±(50–100) ppm), as a result of which frequency trimming is unavoidable. A further problem is that the high clock frequency and the low clock frequency generally have neither a phase nor a frequency reference.

In accordance with an added feature of the invention, the step of trimming the low and high clock frequencies comprises:

a1) starting the counter for the high clock frequency concurrently with a reference counter for the high clock frequency;

a2) stopping the counter for the high clock frequency in dependence on the low clock frequency, defining an intermediate trimming value and, immediately thereafter,
a3) starting the counter for the low clock frequency;
a4) stopping the counter for the low clock frequency at the predetermined first final trimming value and, immediately thereafter;
a5) restarting the counter for the high clock frequency from the intermediate trimming value; and
a6) stopping the counter for the high clock frequency concurrently with the reference counter for the high clock frequency at a second final trimming value predetermined for the reference counter and corresponding to the trimming time period, wherein a count of the counter for the high clock frequency is defined as the reference value for the high clock frequency.

In accordance with an additional feature of the invention, the counter for the high clock frequency is stopped in the above-noted steps c) and/or a2) at a next positive flank of the low clock frequency after the starting of the counter for the high clock frequency.

In accordance with another feature of the invention, the mobile radio system is based on the GSM Standard, a length of the changeover time period is an integer multiple m of a GSM frame length, and a length of the trimming time period is an integer multiple n of the GSM frame length.

In accordance with a further feature of the invention, the first final value is determined by dividing the predetermined first final trimming value by n and by multiplying the value by m, and the second final value is determined by dividing the reference value obtained during trimming by n and by multiplying the value by m.

In accordance with again a further feature of the invention, a division remainder that occurs when dividing the first and/or second final value by n is multiplied by m and, immediately after step h), a remainder counter is started and the remainder counter is stopped at the division remainder multiplied by m.

With the above and other objects in view there is also provided, in accordance with the invention, an apparatus for maintaining a time reference governed by a high clock frequency, in which a changeover is made to a low clock frequency for a specific changeover time period, comprising:
  a high clock frequency generator for a relatively high clock frequency;
  a low clock frequency generator for a relatively low clock frequency;
  a counter for the high clock frequency connected to the high clock frequency generator; a counter for the low clock frequency connected to the low clock frequency generator; and
  a sequence controller connected to the counter for the high clock frequency and to the counter for the low clock frequency, the sequence controller:
    a) trimming the low and high clock frequencies during a trimming time period;
    b) starting the counter for the high clock frequency;
    c) stopping the counter for the high clock frequency in dependence on the low clock frequency, defining an intermediate value and, immediately thereafter,
    d) starting the counter for the low clock frequency;
    e) deactivating the first clock frequency generator;
    f) stopping the counter for the low clock frequency at a first final value, determined on a basis of a predetermined first final trimming value used for trimming, after the activation of the first clock frequency generator and, immediately thereafter,
    g) restarting the counter for the high clock frequency from the intermediate value; and
    h) stopping the counter for the high clock frequency at a second final value, determined on a basis of a reference value, obtained during trimming, for the high clock frequency.

In accordance with again another feature of the invention, there is provided a reference counter for the high clock frequency, and the sequence controller is programmed to carry out the following steps during trimming of the low and high clock frequencies:
  a1) starting the counter for the high clock frequency concurrently with the reference counter for the high clock frequency;
  a2) stopping the counter for the high clock frequency as a function of the low clock frequency, defining an intermediate trimming value and, immediately thereafter;
  a3) starting the counter for the low clock frequency;
  a4) stopping the counter for the low clock frequency at the predetermined first final trimming value and, immediately thereafter,
  a5) restarting the counter for the high clock frequency from the intermediate trimming value; and
  a6) stopping the counter for the high clock frequency concurrently with the reference counter for the high clock frequency at a second final trimming value predetermined for the reference counter and corresponding to the trimming time period, wherein a count of the counter for the high clock frequency is defined as the reference value for the high clock frequency.

In accordance with again another feature of the invention, the sequence controller is programmed to stop the counter for the high clock frequency in step c) and/or step a2) at a next positive flank of the low clock frequency after starting of the counter for the high clock frequency.

As has already been indicated above, the method according to the invention and the apparatus according to the invention are advantageously used in a mobile station in a mobile radio system. If the mobile radio system is based on the GSM Standard, the length of the changeover time period is an integer multiple m of the GSM frame length, and the length of the trimming time period is an integer multiple n of the GSM frame length. The GSM frame length is in this case approximately 4.6 ms. In order to improve the accuracy, it is in this case advantageous for the sequence controller to determine the first final value by dividing the predetermined first final trimming value by n and by multiplying it by m, and to determine the second final value by dividing the reference value obtained during trimming by n, and by multiplying it by m.

In this case, it may be advantageous for the sequence controller to multiply a division remainder, which occurs when dividing the first and/or second final values by n, by m and immediately after step h), to start a remainder counter, and to stop this remainder counter at the division remainder multiplied by m, in order to fill the changeover time period exactly.

The present invention thus provides a complete solution which can be implemented, for example, as a user-specific module in a mobile telephone. As a result of the changeover to a different clock system, the processor in the mobile telephone is relieved of the conversion calculations for the two clock frequency generators, which involve a large amount of computation. The exact frequency of the 32.768 kHz oscillator and the missing phase reference between the two clock frequency generators are measured and taken into account automatically. The object of the software in the mobile telephone is merely synchronous starting of the changeover and presetting the time for which the changeover is intended to be carried out, in multiples of TDMA frames in the case of a GSM system.

As noted above, the invention is most advantageously implemented in a mobile station of a mobile radio system.

In accordance with yet an added feature of the invention, the mobile radio system is based on the GSM Standard, and a length of the changeover time period is an integer multiple m of the GSM frame length, and a length of the trimming time period is an integer multiple n of the GSM frame length.

In accordance with yet an additional feature of the invention, the sequence controller is programmed to determine the first final value by dividing the predetermined first final trimming value by n and by multiplying it by m, and to determine the second final value by dividing the reference value obtained during trimming by n and by multiplying by m.

In accordance with a concomitant feature of the invention, the sequence controller is programmed to multiply by m a division remainder resulting from dividing the first and/or second final value by n, and, immediately after processing step h), to start the remainder counter and to stop the remainder counter at the division remainder multiplied by m.

Other features which are considered as characteristic for the invention are set forth in the appended claims.

Although the invention is illustrated and described herein as embodied in a method and apparatus for using a low clock frequency to maintain a time reference which is governed by a high clock frequency, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
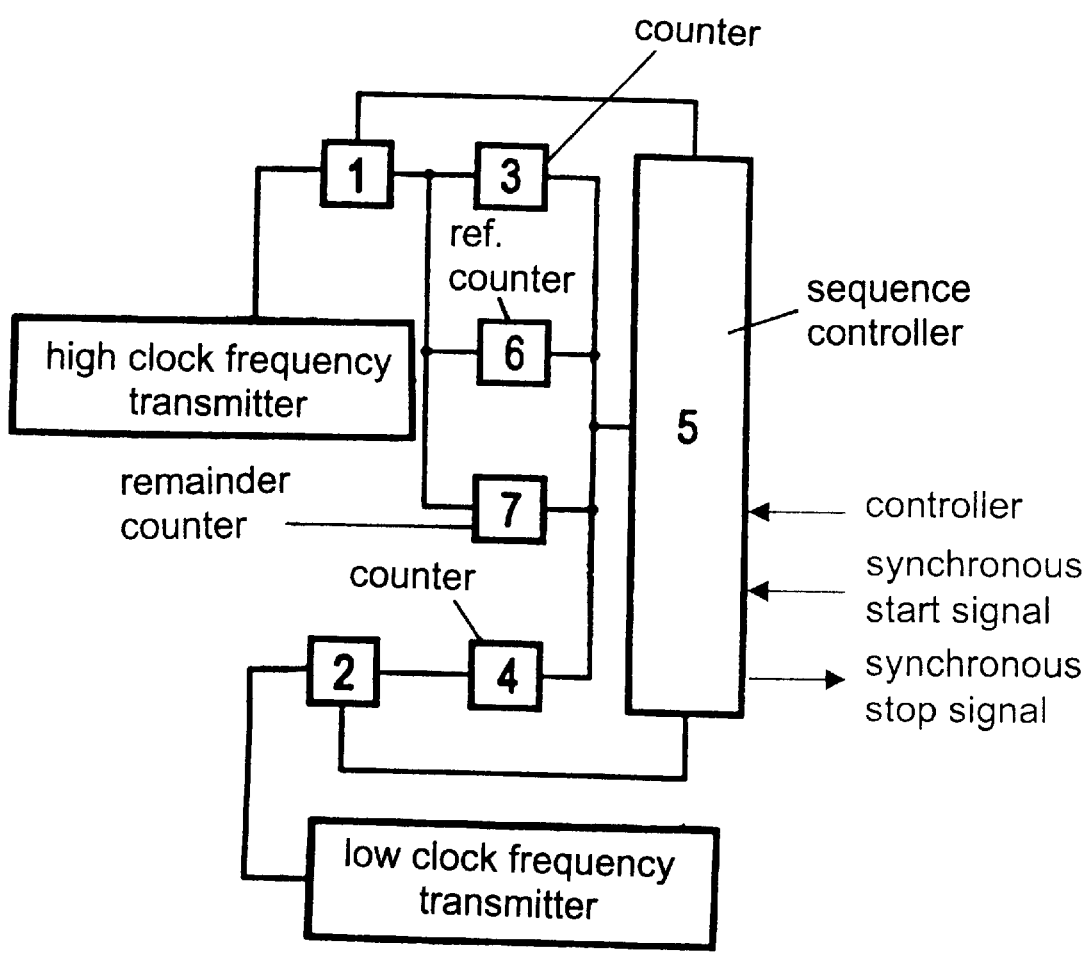
FIG. 1 is a schematic illustration of an apparatus for using a low clock frequency to maintain a time reference governed by a high clock frequency, in accordance with the present invention.

Referring now to the figures of the drawing in detail and first, particularly, to FIG. 1 thereof, there is shown a schematic illustration of an apparatus for using a low clock frequency to maintain a time reference which is governed by a high clock frequency. The apparatus according to the invention comprises a clock frequency generator 1 for the high clock frequency, and a clock frequency generator 2 for the low clock frequency. In a mobile station which is operated using the GSM Standard, the high clock frequency is, for example, approximately 13 MHz, and the low clock frequency is, for example, 32.768 kHz. The clock frequency generator 1 for the high clock frequency is connected to a counter 3 for the high clock frequency, and the clock frequency generator 2 for the low clock frequency is connected to a counter 4 for the low clock frequency. Furthermore, the apparatus according to the invention and in the illustrated exemplary embodiment comprises a reference counter 6 for the fast clock frequency, which is used to preset the trimming time period for trimming the low and high clock frequencies, as well as a remainder counter 7 for the high clock frequency, in order to improve the precision of the changeover to the low clock frequency when an integer multiple of GSM frames is used as the trimming time period for trimming.

The clock frequency generator 1 for the high clock frequency, the clock frequency generator 2 for the low clock frequency, the counter 3 for the high clock frequency, the counter 4 for the low clock frequency, the reference counter 6 for the high clock frequency and the remainder counter 7 for the high clock frequency are connected to a sequence controller 5, which controls the method according to the invention and the apparatus according to the invention.

In the exemplary embodiment illustrated and explained herein, the method according to the invention is based on the time period which is to be measured and is subsequently to be multiplied comprising a number of low-frequency (32.768 kHz) clock cycles and a number of high-frequency (13 MHz) clock cycles. The measurement and trimming of the frequency of the clock frequency generator 2 for the low clock frequency is carried out over a number of TDMA frames (GSM frames), for example 16, in, for example, a mobile station using the GSM Standard. This is necessary to achieve the required accuracy. The exact time period of 16 TDMA frames is governed by the reference counter 6 for the high clock frequency. The counter 3 for the high frequency is started at the same time as the reference counter 6 for the high frequency. The counter 3 counts until the next positive flank of the low-frequency clock frequency (32.768 kHz), and is then stopped. This allows the phase shift of the clock frequency generator 1 and of the clock frequency generator 2 to be detected. From this point in time, the counter 4 for the low clock frequency counts a predetermined and known number of clock cycles (first final trimming value), stops at the end and, via the sequence controller 5, initiates the enabling of the counter 3 for the high clock frequency once again. The counter 3 for the high clock frequency now counts from the previous intermediate trimming value onwards to the exact end of the trimming time period to be measured. The trimming time period is in this case governed by the reference counter 6 for the fast clock frequency, which stops at a predetermined second final trimming value, which corresponds to the trimming time period, and at the same time, via the sequence controller 5, stops the counter 3 for the high clock frequency.

The determined final value of the counter 3 for the high clock frequency is defined as a reference value for the high clock frequency and is stored, for example, in the sequence controller 5. The trimming time period is now defined by a known number of low-frequency clock cycles (first final trimming value) and a determined number of high-frequency clock cycles (reference value for the high clock frequency). At the same time, the phase relationship between the clock frequency generator 1 for the high clock frequency and the clock frequency generator 2 for the low clock frequency was taken into account. The exact frequency of the clock frequency generator 2 for the low clock frequency is not output explicitly, but is included in the sum of the counts of the counter 3 and of the counter 4.

In order to use the method according to the invention and the apparatus according to the invention in a mobile station in a GSM mobile radio system, it is necessary to achieve a time resolution of one TDMA frame. This is achieved by dividing by 16 the reference value for the high clock frequency determined by 16 TDMA frames by the counter 3 for the high clock frequency. The software in the mobile station determines which integer multiple m of the TDMA frame length (GSM frame length) is intended to cover the changeover time period. All integer values up to a maximum value are possible in this case.

In order to start the clock frequency generator changeover, the sequence controller 5 in the apparatus according to the invention, for example a mobile station, defines a pulse which activates the counter 3 for the high clock frequency in synchronism with the time reference for the GSM reference. The counter 3 for the high frequency counts until the next positive flank of the low clock frequency occurs and then stops, thus detecting the phase shift x (see FIG. 2). The counter 4 for the low clock frequency then starts to count. In parallel with this, the clock transmitter 1 for the high clock frequency is deactivated or switched off by the sequence controller 5. The counter 4 for the low frequency counts as far as a first final value, which was determined on the basis of the predetermined first final trimming value used for trimming. In the exemplary embodiment, the first final value was determined by dividing by 16 the first final trimming value used for trimming, and by multiplying this by the integer multiple m of the GSM frame length.

The first clock frequency generator 1 for the high clock frequency is activated or started again shortly before or in synchronism with the stopping of the counter 4 for the low clock frequency at the first final value. Immediately after the stopping of the counter 4 for the low clock frequency, the sequence controller 5 once again activates the counter 3 for the high clock frequency, which continues to count from the previously defined intermediate value up to the second final value. The second final value was determined on the basis of the reference value, obtained during trimming, for the fast clock frequency. In the example under consideration, the second final value was determined by dividing by n the reference value obtained during trimming, and by multiplying this by m.

The clock transmitter 1 for the high clock frequency is thus switched off during a time period a (see FIG. 2) in which the counter 4 for the low clock frequency is running. A time period y (see FIG. 2) in which the counter 3 for the high clock frequency counts from the intermediate value up to the second final value, defines the exact changeover time period for the maintenance of the time reference which is governed by the first clock frequency generator for the high clock frequency. In order to take account of the division remainder which occurs in the determination of the first final value and of the second final value, this division remainder has to be accumulated over the number m of GSM frame lengths in the changeover time period. Accordingly, once the counter 3 for the high clock frequency has been stopped, the remainder counter 7 for the high clock frequency is started and counts up to the end of the final value obtained by multiplying the number m by the division remainder. When this final value is reached, the remainder counter 7 stops, and the end of the predetermined changeover time period is reached, as an integer multiple m of the GSM frame length.

After this, the mobile station can be changed back to the first clock transmitting unit for the high clock frequency, in synchronism with the high clock frequency.

The deliberate switching of the counter 3 for the high clock frequency, of the counter 4 for the low clock frequency, of the remainder counter 7 for the high clock frequency and of the reference counter 6 for the high clock frequency is carried out by the sequence controller 5. The time period a in which the counter 4 for the low clock frequency is running and the first clock frequency generator 1 for the high clock frequency in the mobile station is switched off, is considerably longer than the time period (x+y) in which the first clock frequency generator 1 for the high clock frequency is activated throughout the entire changeover time period. Since the second clock frequency generator 2 for the low clock frequency consumes considerably less power than the first clock frequency generator 1 for the high clock frequency, this thus results in a reduction in the mean power consumed by the mobile station.

Figure 2:
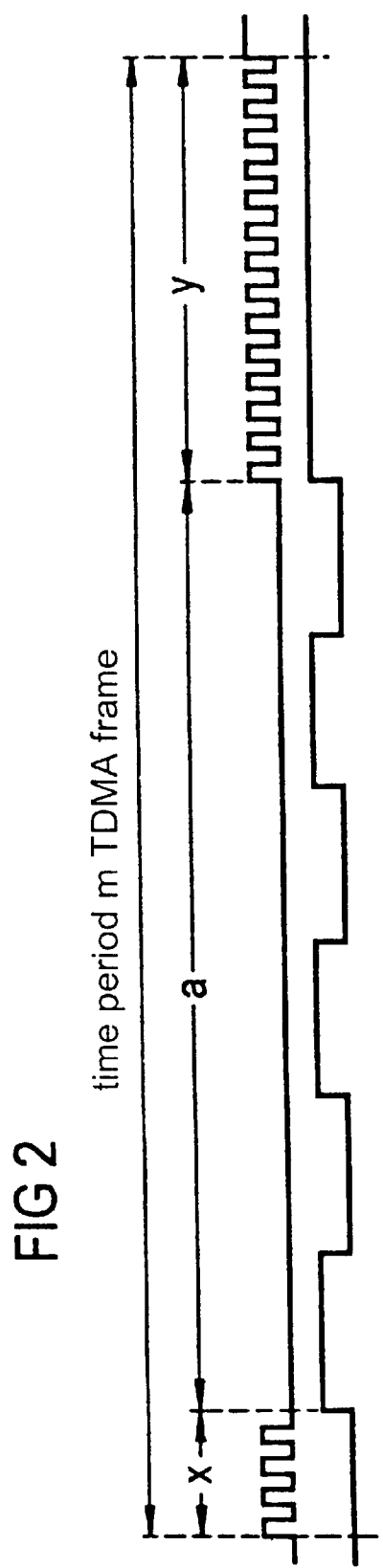
FIG. 2 is a schematic time diagram illustrating the relationships between the high clock frequency and the low clock frequency in a predetermined changeover time period.

To illustrate this situation, FIG. 2 shows a changeover time period comprising m GSM frames. The changeover time period is composed, as has been explained above, of the time periods x, a and y. The time period a denotes the time period in which the second clock frequency generator 2 takes over the function of the first clock frequency generator 1 for the high clock frequency, and the latter is deactivated. In the time periods x and y, the first clock frequency generator is activated, as is illustrated by the radio-frequency square-wave. The number x of clock cycles at the high frequency covers the phase shift between the two clock systems, and the number y of high-frequency clock cycles defines the exact changeover time period.

We claim:

1. A method of maintaining a time reference governed by a high clock frequency produced by a first clock frequency generator, wherein a changeover is made, for a changeover time period, to a low clock frequency produced by a second clock frequency generator, the method comprising the following method steps:
   a) trimming the low and high clock frequencies during a trimming time period;
   b) starting a counter for the high clock frequency;
   c) stopping the counter for the high clock frequency in dependence of the low clock frequency, defining an intermediate value and, immediately thereafter,
   d) starting a counter for the low clock frequency;
   e) deactivating the first clock frequency generator;
   f) stopping the counter for the low clock frequency at a first final value determined on the basis of a predetermined first final trimming value used for trimming, after an activation of the first clock frequency generator and, immediately thereafter,
   g) restarting the counter for the high clock frequency from the intermediate value; and
   h) stopping the counter for the high clock frequency at a second final value determined on the basis of a reference value, obtained during trimming, for the high clock frequency.

2. The method according to claim 1, wherein the step of trimming the low and high clock frequencies comprises:
   a1) starting the counter for the fast clock frequency concurrently with a reference counter for the high clock frequency;
   a2) stopping the counter for the high clock frequency in dependence on the low clock frequency, defining an intermediate trimming value and, immediately thereafter, a3) starting the counter for the low clock frequency;

a4) stopping the counter for the high clock frequency at the predetermined first final trimming value and, immediately thereafter;

a5) restarting the counter for the high clock frequency from the intermediate trimming value; and a6) stopping the counter for the high clock frequency concurrently with the reference counter for the high clock frequency at a second final trimming value predetermined for the reference counter and corresponding to the trimming time period, wherein a count of the counter for the high clock frequency is defined as the reference value for the high clock frequency.

3. The method according to claim 2, which comprises stopping the counter for the high clock frequency in one of steps c) and a2) at a next positive flank of the low clock frequency after the starting of the counter for the high clock frequency.

4. The method according to claim 1, wherein the low clock frequency is a clock frequency in a mobile station of a mobile radio system and the high clock frequency is a system clock frequency in the mobile radio system.

5. The method according to claim 4, wherein the mobile radio system is based on the GSM Standard, a length of the changeover time period is an integer multiple m of a GSM frame length, and a length of the trimming time period is an integer multiple n of the GSM frame length.

6. The method according to claim 5, which comprises determining the first final value by dividing the predetermined first final trimming value by n and by multiplying the value by m, and wherein the second final value is determined by dividing the reference value obtained during trimming by n and by multiplying the value by m.

7. The method according to claim 6, which comprises multiplying with m a division remainder that occurs when dividing the first and/or second final value by n and, immediately after step h), starting a remainder counter and stopping the remainder counter at the division remainder multiplied by m.

8. An apparatus for maintaining a time reference governed by a high clock frequency, in which a changeover is made to a low clock frequency for a specific changeover time period, comprising:

a high clock frequency generator for a relatively high clock frequency;

a low clock frequency generator for a relatively low clock frequency;

a counter for the high clock frequency connected to said high clock frequency generator;

a counter for the low clock frequency connected to said low clock frequency generator; and a sequence controller connected to said counter for the high clock frequency and to said counter for the low clock frequency, said sequence controller:

a) trimming the low and high clock frequencies during a trimming time period;

b) starting said counter for the high clock frequency;

c) stopping said counter for the high clock frequency in dependence on the low clock frequency, defining an intermediate value and, immediately thereafter, d) starting said counter for the low clock frequency;

e) deactivating said first clock frequency generator;

f) stopping said counter for the low clock frequency at a first final value, determined on a basis of a predetermined first final trimming value used for trimming, after the activation of said first clock frequency generator and, immediately thereafter, g) restarting said counter for the high clock frequency from the intermediate value; and h) stopping said counter for the high clock frequency at a second final value, determined on a basis of a reference value, obtained during trimming, for the high clock frequency.

9. The apparatus according to claim 8, which further comprises a reference counter for the high clock frequency, and wherein said sequence controller is programmed to carry out the following steps during trimming of the low and high clock frequencies:

a1) starting said counter for the high clock frequency concurrently with said reference counter for the high clock frequency;

a2) stopping said counter for the high clock frequency as a function of the low clock frequency, defining an intermediate trimming value and, immediately thereafter;

a3) starting said counter for the low clock frequency;

a4) stopping said counter for the low clock frequency at the predetermined first final trimming value and, immediately thereafter, a5) restarting said counter for the high clock frequency from the intermediate trimming value; and a6) stopping said counter for the high clock frequency concurrently with said reference counter for the high clock frequency at a second final trimming value predetermined for the reference counter and corresponding to the trimming time period, wherein a count of said counter for the high clock frequency is defined as the reference value for the high clock frequency.

10. The apparatus according to claim 8, wherein said sequence controller is programmed to stop said counter for the high clock frequency in one of step c) and step a2) at a next positive flank of the low clock frequency after starting of said counter for the high clock frequency.

11. In combination with a mobile station in a mobile radio system, the apparatus according to claim 8.

12. The combination according to claim 11, wherein the mobile radio system is based on the GSM Standard, and a length of the changeover time period is an integer multiple m of the GSM frame length, and a length of the trimming time period is an integer multiple n of the GSM frame length.

13. The combination according to claim 12, wherein said sequence controller is programmed to determine the first final value by dividing the predetermined first final trimming value by n and by multiplying it by m, and to determine the second final value by dividing the reference value obtained during trimming by n and by multiplying by m.

14. The combination according to claim 13, which further comprises a remainder counter, and wherein said sequence controller is programmed to multiply by m a division remainder resulting from dividing the first and/or second final value by n, and, immediately after processing step h), to start said remainder counter and to stop said remainder counter at the division remainder multiplied by m.

* * * * *